United States Patent [19]

Kennedy

[11] Patent Number: 5,619,559

[45] Date of Patent: Apr. 8, 1997

[54] FINANCIAL CARD AUTHORIZATION SYSTEM

[75] Inventor: Rand A. Kennedy, Worthington, Ohio

[73] Assignee: CompuServe Incorporated, Columbus, Ohio

[21] Appl. No.: 507,652

[22] Filed: Jul. 25, 1995

Related U.S. Application Data

[63] Continuation of Ser. No. 328,537, Oct. 25, 1994, abandoned, which is a continuation of Ser. No. 904,199, Jun. 25, 1992, abandoned.

[51] Int. Cl.$^6$ .................................................. H04M 11/00
[52] U.S. Cl. ........................................... 379/91; 379/93
[58] Field of Search .......................... 379/91, 94, 90, 379/93, 98; 375/222

[56] References Cited

U.S. PATENT DOCUMENTS

| | | | |
|---|---|---|---|
| 4,796,292 | 1/1989 | Thomas | 379/91 |
| 4,797,913 | 1/1989 | Kaplan et al. | 379/91 |
| 5,113,430 | 5/1992 | Richardson, Jr. et al. | 379/94 |
| 5,163,086 | 11/1992 | Ahearn et al. | 379/91 |
| 5,220,501 | 6/1993 | Lawlor et al. | 379/90 |
| 5,307,402 | 4/1994 | Cooper | 379/98 |
| 5,315,641 | 5/1994 | Montgomery et al. | 379/98 |

*Primary Examiner*—Stella Woo
*Attorney, Agent, or Firm*—Standley & Gilcrest

[57] ABSTRACT

A credit card authorization network which takes advantage of an all digital system to eliminate the need for analog to digital signal conversion. This allows for faster response time as well as reduced telephone charges. A credit card company may operate as an interexchange customer providing trunk protocol executing network access system devices at a Feature Group B access facility.

2 Claims, 3 Drawing Sheets

FINANCIAL CARD AUTHORIZATION SYSTEM

This is a continuation application of prior U.S. application Ser. No. 08/328,537 filed on Oct. 25, 1994, now abandoned, said application being a file wrapper continuation of U.S. application Ser. No. 07/904,199 filed Jun. 25, 1992, entitled FINANCIAL CARD AUTHORIZATION SYSTEM, now abandoned.

BACKGROUND AND SUMMARY THE INVENTION

The present invention relates generally to a system for data transmission across what are commonly known as telephone lines, and more particularly, to a system for authorization of financial cards transactions.

Financial cards, usually credit cards, are commonly used by purchasers in retail establishments to pay for goods purchased. The retail establishment normally verifies that the credit card is approved for such transactions by verification through a credit card approver such as a bank or credit card company. The retail establishments are usually equipped with a terminal containing a modem which is connected to a local telephone line. A portion of the credit card is normally passed through a slot in the terminal at which time identification information is collected from the card. The terminal then automatically dials a previously programmed phone number to begin the authorization process. The number called by the authorization terminal will be an answering modem and this answering modem may be connected to a packet assembler/disassembler (PAD) or other multiplexer or concentrator that may be connected through another line to a host computer. When the answering modem takes the call from the authorization terminal modem, the identification information is transmitted across the line. The host computer processes this information and transmits back to the authorization terminal whether or not the credit card has been approved for this transaction.

Even if the telephone number which the authorization terminal modem dials is a local number, the retail establishment is still charged a nominal rate for each local call. These charges incurred by the retailer can become quite significant when it is considered that several credit card authorization calls may be made each business day. Some credit card companies have opted to attempt to absorb the local call charges incurred by the retailers. In the past, this has been done by offering a 1-800 number for the retailer to call for credit call approval. In this way, the retailer is not charged for the local call, but instead the number being called is billed for the call.

Efforts were also undertaken to shorten the time for each authorization call. In this regard, the modems were provided with ground start interfaces which allowed the call coming from the retailer to be answered by the answering modem before the answering modem actually rang.

Other known systems have used channel banks and FXS channel interface cards along with a ground-start interface to translate to/from an E&M supervisory signalling format. The present invention accomplishes the intended function without employing channel bank cards or an FXS interface card. Known systems have required an associated dedicated modem and channel bank for each access tandem. This requires additional dedicated hardware to service each access tandem. However, the present invention is dynamic in that it is capable of using a single piece of hardware to connect with multiple access tandems. This hardware results in the need for fewer RS-232 interfaces than required by the known systems. This is a significant cost savings. Additionally, the known systems require an analog-to-digital conversion mechanism to convert the digitized transmission to an analog transmission in the form of voice and multi-frequency (MF) tones mixed together. In the known systems the analog signal passes through physical interfaces to an MF receiver and ultimately to the modem. The analog signal is then converted to digital form for transmission to an exchange carrier (EC) access tandem. As stated previously, the present invention does not require analog to digital conversion. The present invention is entirely digital which results in a faster processing time that translates into less usage of telephone lines and, therefore less cost per call.

The present invention represents a dramatic improvement in the state of the art of credit card authorization. The present invention takes advantage of the opportunity that credit card companies now have to become interexchange customers (IXC) through the telephone system network. The present invention takes advantage of relatively new trunk interfaces known as Feature Groups. There are currently four defined Feature Groups known as A, B, C and D. In the present invention the retailer's authorization terminal modem initiates a call through a local exchange office and from the exchange office the call is directed to an access tandem (AT) switch to gain access to long distance service. From the access tandem, the information is transferred across a Feature Group trunk to a network access system (NAS) device which demultiplexes and demodulates the signal. NAS works in conjunction with a plurality of asynchronous RS-232 interfaces and one or more micronodes which act as a packet assembler/disassembler and network processor or packet switch for accomplishing formatting, error checking, etc. NAS and the micronode(s) system are entirely digital and do not require analog to digital conversion capabilities. From the micronode(s), the transaction data is transferred through a value-added network, such as that provided by CompuServe, the applicant for the present invention. The signal may be transferred via an X0.25 protocol and is ultimately received by a host computer.

Further objects and advantages of the invention will become apparent when viewed in light of the following drawings and detailed description.

DETAILED DESCRIPTION OF PREFERRED EMBODIMENTS(S)

Figure 1:
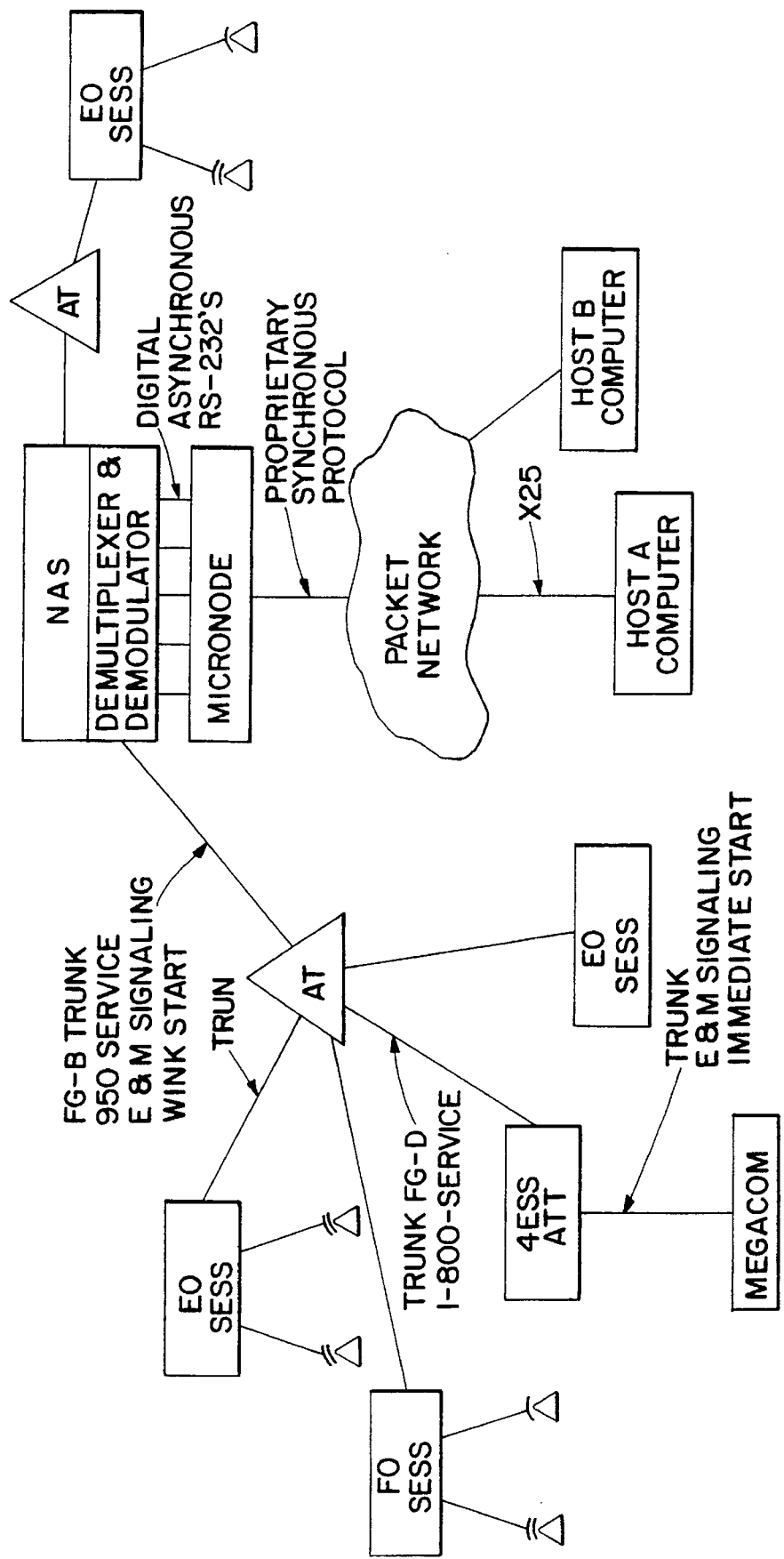
FIG. 1 illustrates a telephone switching network that includes the credit card authorization scheme of the present invention.

Referring now to FIG. 1, a telephone switching network is shown having telephone lines and trunks. Switches are included for making connections between lines and lines, and lines and trunks. A trunk connects two switching systems, whereas a line connects a central office with a customer's terminal. The Bell operating companies are the exchange carriers (EC) which offer telecommunication services. Interexchange carriers and other IXC's provide other services between local access and transport areas. The specific switched access arrangements offered by the Bell operating companies are known as Feature Groups. An end office (EO) is a Bell operating company switching system within a local access and transport area where customer telephone lines are terminated for purposes of connection to trunks. A call from a customer may go directly from an end office to its destination, or it may be connected through a second office known as an access tandem (AT) to reach the IXC.

An access tandem is a Bell operating company system that provides an IXC with access to more than one end office (EO). As shown in FIG. 1, the exchange carrier offers the interexchange carrier a choice of-switched access arrangements, called Feature Groups. For example, Feature Group B and Feature Group D are shown in FIG. 1. Each IXC will select a particular Feature Group based on its own needs and business considerations. In a preferred embodiment of the present invention Feature Group B is used which is also commonly known as 950 service. To access Feature Group B, the three prefix numbers dialed are 950. After 950 is dialed, a four-digit access code is also dialed which is unique to each IXC. Feature Group D service is commonly used for 1-800 service and equal access to IXC's. It too can be used in the present invention, however, Feature Group B is currently more cost effective.

In FIG. 1, a credit card authorization terminal is connected via an ordinary telephone line to a central office. The authorization terminal includes a standard modem. In the beginning of the process, the terminal dials a number which is associated with a line connected to a value added network (VAN). The connection is made through the EO. According to the present invention, the credit card company, such as VISA, may be assigned its own three-digit customer identification code. It then becomes an interexchange carrier. The present invention offers a way to terminate a plurality of T1 links to AT's, which heretofore was not feasible. An NAS device may interconnect with a plurality of AT's. With the credit card company becoming an IXC, its authorization terminals may all dial the same number. That number is 950-0/1XXX, where XXX is the credit card company's carrier identification code number. This number will gain access to a Feature Group B trunk of the local EO. The credit card company then simply does not bill the retailer which accesses its trunks. This way the IXC may absorb all costs. Additionally, the overall charges are reduced.

Figure 2:
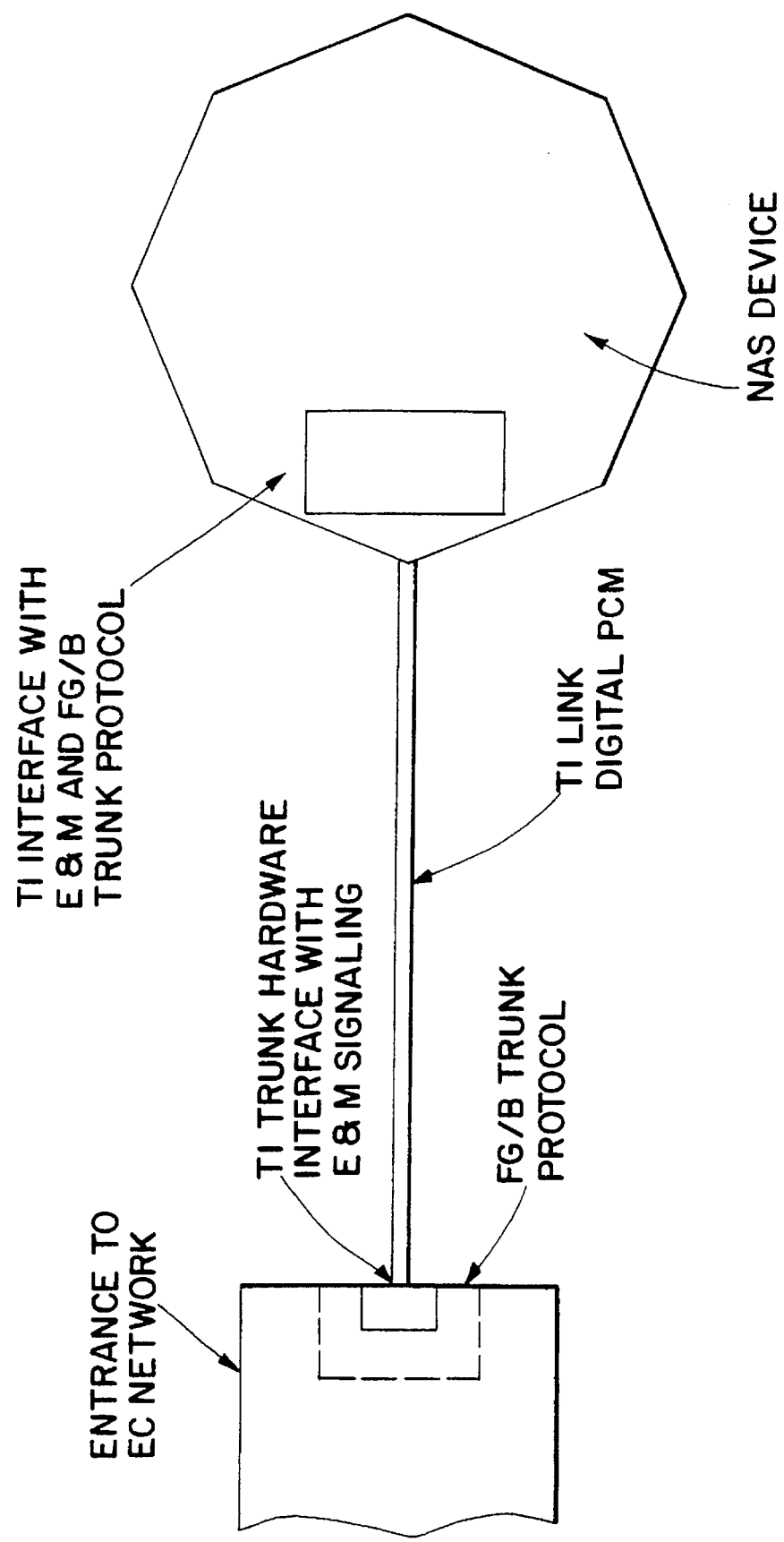
FIG. 2 illustrates a portion of the credit card authorization system of the present invention.

Each NAS device in the present invention requires an interface which meets Feature Group B or D specifications and the NAS device must be capable of exercising feature group trunk protocols. FIG. 2 reflects this part of the system of the present invention. The EC establishes a trunk connection. To accomplish this there must be a trunk hardware interface which is indicated by the solid line in FIG. 2. The access tandem initiates trunk protocols which are depicted symbolically by dashed lines in FIG. 2. Although the number of trunk protocols are not limitless there is more than one trunk protocol which can be used with each trunk hardware interface.

In the present invention, the EC provides Feature Group B service on T1 access facilities. A unique T1 trunk hardware interface is used employing a Feature Group trunk protocol. At the other end of the T1 link is an all digital NAS. This NAS interfaces with the T1 digital link. This aspect of the invention is unique to all other systems known. The all digital NAS comprises a demultiplexer and modulator/demodulator for remote modification of functionality, including upgrades. A plurality of RS-232's connect the NAS to a micronode which is actually a PAD/network processor/packet switch which does formatting, error checking to the terminal device and error correction, and other functions to the packet network,or VAN. The micronode is also software down loadable. This NAS and micronode construction is unique in that it is entirely digital unlike previous systems which required analog to digital conversion. An NAS device may be purchased from Primary Access in San Diego, Calif. A micronode device may be purchased from CompuServe Incorporated in Columbus, Ohio.

Figure 3:
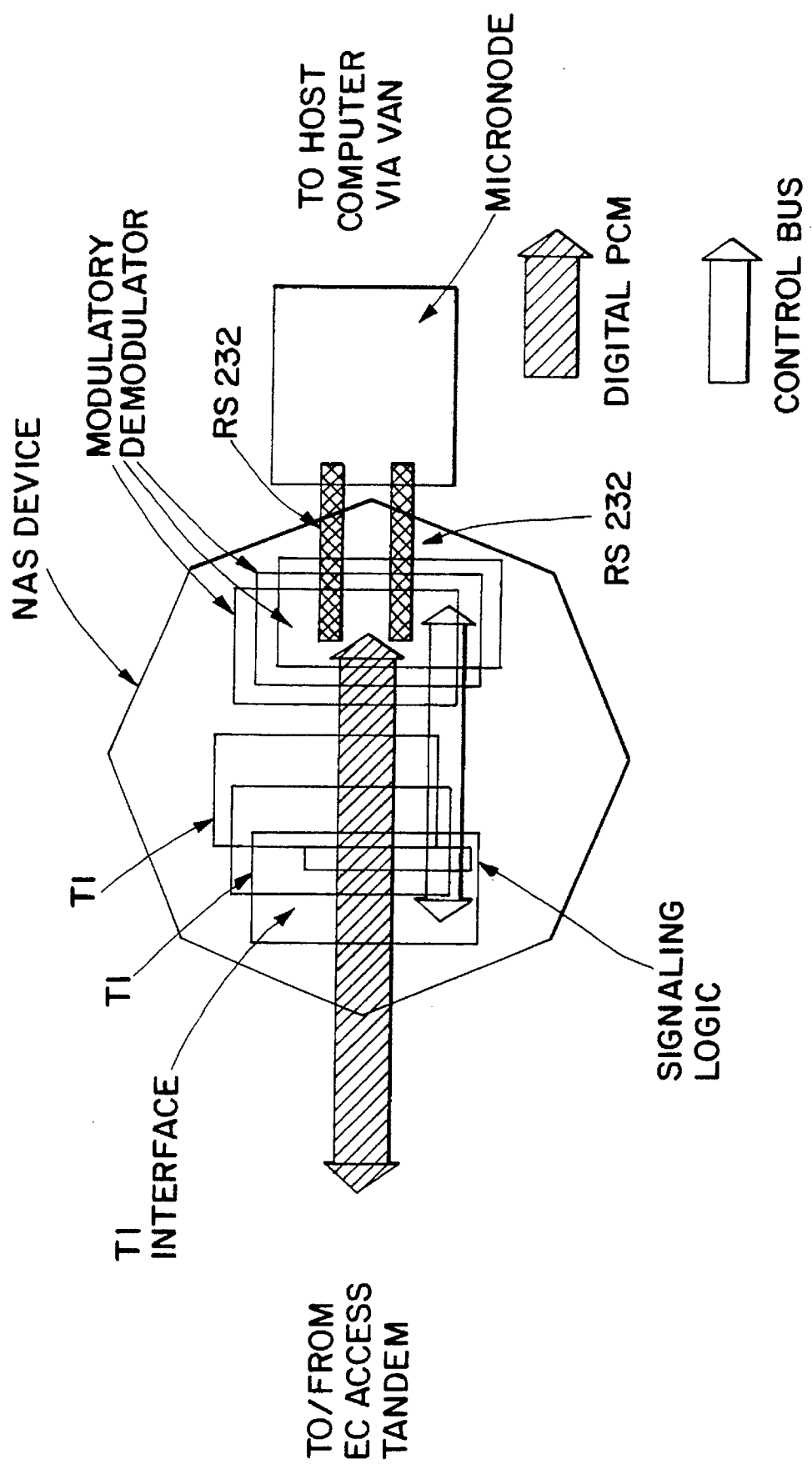
FIG. 3 is a diagramatical representation of the system preferred embodiment of the present invention.

FIG. 3 is a functional diagram illustrating the preferred embodiment of the present invention. The line code of FIG. 3 represents transmission, address and control signalling, and physical interface signalling.

EXAMPLE

As an example, the present invention will now be described as it works to authorize a credit card transaction. A consumer uses a credit card to make a purchase. The sales clerk at the store may attempt to verify that the consumer's credit card is not cancelled by the credit card company or the bank issuing the credit card. The authorization may also include information such as whether the credit card is listed as stolen and whether the dollar amount of the transaction is within the consumer's credit limit. The present invention is also useful to transfer data in a debit transaction also known as data capture.

The sales clerk will then pass the credit card magnetic strip through a slot in the point-of-sale terminal to read certain information from the magnetic strip, such as bank identification, consumer identification, etc. The sales clerk will enter the information concerning the particular purchase, such as dollar amount of the transaction.

Next, a modem associated with the point-of-sale authorization terminal dials a preselected phone number which includes a Feature Group identifier prefix and an IXC access carrier identification code. The number dialed will reach an EO. The EO connects the call to an AT. The AT connects the call to a T1 trunk associated with the identified IXC. The IXC receives the call via a Feature Group trunk protocol.

The incoming call to the IXC is received by the NAS which indicates to the micronode that there is an incoming call via a RS-232 interface. The micronode requests that the call be accepted by the NAS. The NAS and the point-of-sale modem then "handshake" and enter data mode. The micronode sends an enquiry (ENQ) character to the point-of-sale terminal which responds with the transaction data. The micronode examines routing information contained in the transaction data and establishes an error free connection to the host computer through a value added network and then sends the transaction data to the host computer. The packet switch aspect of the micronode is responsible for establishing error free connection from the NAS to the host computer. The host computer makes a decision concerning authorization and communicates with the point-of-sale terminal via the same route in return.

While it will be apparent that the preferred embodiment of the invention disclosed is well-calculated to provide the features stated, it will also be appreciated that the invention is susceptible to modification, variation and change in the various components and assembly of the system without departing from the proper scope or fair meaning of the following claims.

What is claimed is:

1. A method of constructing a credit card authorization network over a public telephone switched network comprising the steps of:

providing a feature group trunk;

providing an all digital network access system (NAS) device directly connected to said feature group trunk via a T1 digital link;

providing a plurality of credit card authorization terminals for automatically accessing said feature group trunk through an exchange carrier;

providing a micronode connected by an RS-232 interface to said NAS device;

providing a communication network for connection with said micronode; and providing a host computer in communication with said communication network, such that said authorization terminals access said NAS device using said feature group trunk, and said micronode processes data communication between said communication network and said NAS device to enable said authorization terminals to communicate with said host computer.

2. A system for connecting selected financial card authorization terminals to a predetermined destination over a public switched telephone network said public switched telephone network having central offices for effecting switched connections between station lines and trunks, and trunk switching facilities, under control of exchange carriers (EC's), and a plurality of interexchange customers (IXC's), said IXC's having a choice of feature group line side and trunk side switched access arrangements, with a cost per call charge by an EC for a call involving an IXC which interfaces with the EC via a feature group access facility trunk being borne solely by the IXC, said system comprising:

a network access system (NAS) device which operates to receive digital signals and to transmit digital signals and which is independent of analog to digital signal conversion;

a T1 digital link employing a feature group trunk protocol directly interconnecting said NAS device to an access tandem;

means for interconnecting said authorization terminals to said access tandem via feature group trunks;

a value added network in association with said NAS device for extending communication to said predetermined destination; and a micronode in association with said NAS device, said micronode functioning as a network processor and data packet switch to allow communication between the NAS device and the predetermined destination through said value added network, wherein the predetermined destination is a host computer capable of processing data supplied by said authorization terminals.

* * * * *

UNITED STATES PATENT AND TRADEMARK OFFICE
CERTIFICATE OF CORRECTION

PATENT NO. : 5,619,559

DATED : April 8, 1997

INVENTOR(S) : Rand A. Kennedy

It is certified that error appears in the above-indentified patent and that said Letters Patent is hereby corrected as shown below:

In column 3, line 65, please insert after "demodulator" the following: -- and is software down loadable. This feature allows --.

In column 4, line 3, please delete " , " and replace it with a space.

Signed and Sealed this

Eighth Day of July, 1997

Attest:

Attesting Officer

BRUCE LEHMAN

Commissioner of Patents and Trademarks